United States Patent [19]

Sun

[11] Patent Number: 5,287,221
[45] Date of Patent: Feb. 15, 1994

[54] DYNAMIC FLASHING REFLECTOR ROTATABLY MOUNTED ON VEHICLE WHEEL

[76] Inventor: Chih-Kuo Sun, c/o Hung Hsing Patent Service Center, P.O. Box 55-1670, Taipei (10477), Taiwan

[21] Appl. No.: 62,207

[22] Filed: May 18, 1993

[51] Int. Cl.⁵ .............................................. G02B 5/12
[52] U.S. Cl. .................................. 359/523; 359/522; 359/525
[58] Field of Search ............... 359/515, 520, 522, 523, 359/525, 555

[56] References Cited

U.S. PATENT DOCUMENTS

| | | | |
|---|---|---|---|
| 3,310,357 | 3/1967 | Hogan | 359/523 |
| 3,374,763 | 3/1968 | Browning | 359/525 |
| 3,578,840 | 5/1971 | Richards | 359/525 |
| 4,467,404 | 8/1984 | Gordon | 359/523 |
| 4,741,598 | 5/1988 | Goedert | 359/522 |
| 5,196,961 | 3/1993 | Sun | 359/522 |

Primary Examiner—Loha Ben

[57] ABSTRACT

A reflector includes a rotor disk rotatably mounted on a bike spoke having two semi-circular blades respectively formed on two surfaces of the rotor disk for driving a rotation of the rotor disk when subjected to a wind force when driving a bike, and having a retroreflective surface and a light-absorptive surface respectively formed on two opposite surfaces of the rotor disk for producing a flashing operation when rotating the disk, thereby providing a dynamic flashing reflector on a bike or the like for traffic warning or interesting purpose.

5 Claims, 5 Drawing Sheets

DYNAMIC FLASHING REFLECTOR ROTATABLY MOUNTED ON VEHICLE WHEEL

BACKGROUND OF THE INVENTION

A conventional reflector Rf may be fixed on a spoke S of a bike wheel W as shown in FIGS. 7, 8, whereby upon a rotation driving of a bike wheel W, the reflector Rf when reflecting an incident light may become an illuminative "ring" as shown in FIG. 8. However, such a conventional bike reflector Rf may still have the following drawbacks:

1. The reflector is generally formed as an arcuate plate secured on the wheel spokes, which can reflect lights, but unable to flash, thereby decreasing warning effect and using interest.
2. Several rivets or screws or other fastening means should be further provided to fix the reflector Rf on the spokes, requiring additional tool for installing such a reflector on a spoke and causing inconvenience therefor.
3. For installing, repairing or maintaining the reflectors, it may require a professional skill as provided in a shop, thereby wasting time and money.

SUMMARY OF THE INVENTION

The object of the present invention is to provide a reflector including a rotor disk rotatably mounted on a bike spoke having two blades respectively formed on two surfaces of the rotor disk for driving a rotation of the rotor disk when subjected to a wind force when driving a bike, and having a retroreflective surface and a light-absorptive surface respectively formed on two opposite surfaces of the rotor disk for producing a flashing operation when rotating the disk, thereby providing a dynamic flashing reflector on a bike or the like for traffic warning or interesting purpose.

DETAILED DESCRIPTION

Figure 1:
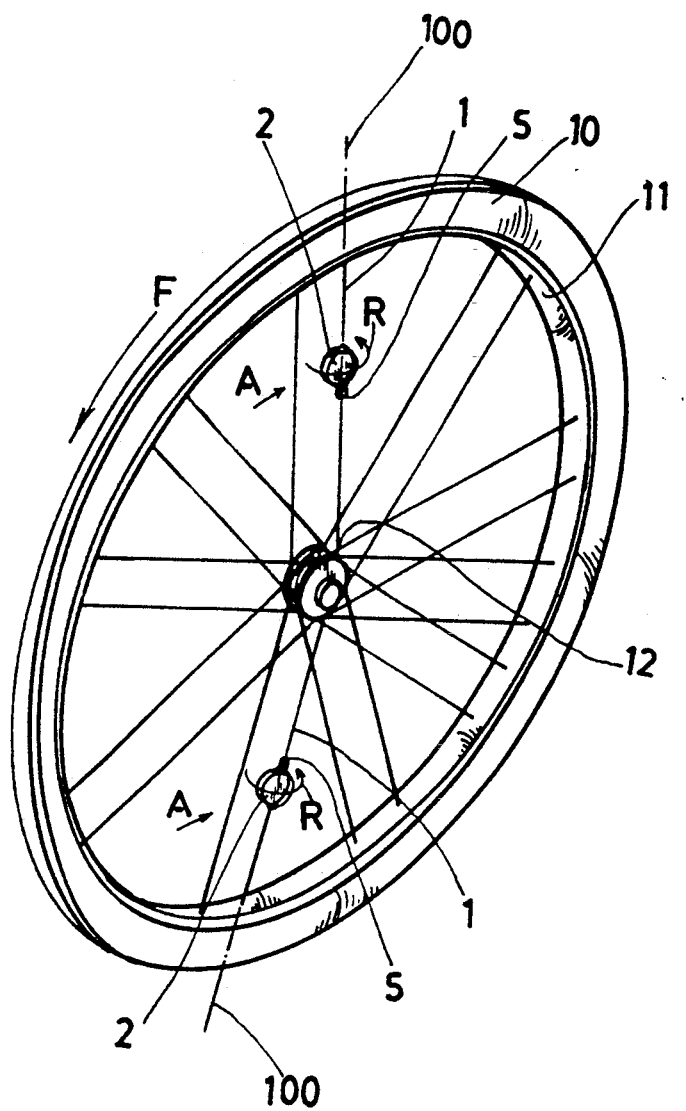
FIG. 1 is a perspective view of the present invention when mounted on a bike wheel.
Figure 3:
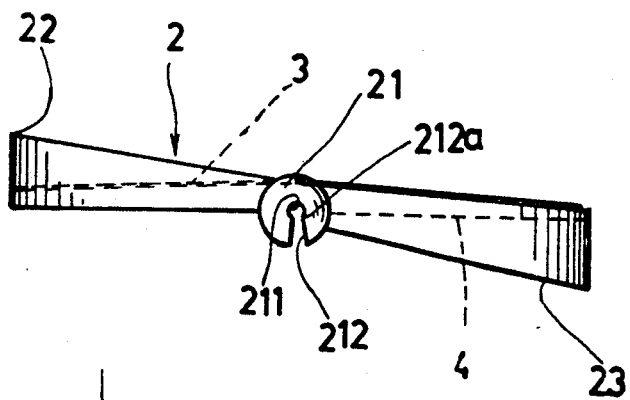
FIG. 3 is a top view illustration of the rotor disk of the present invention.
Figure 2:
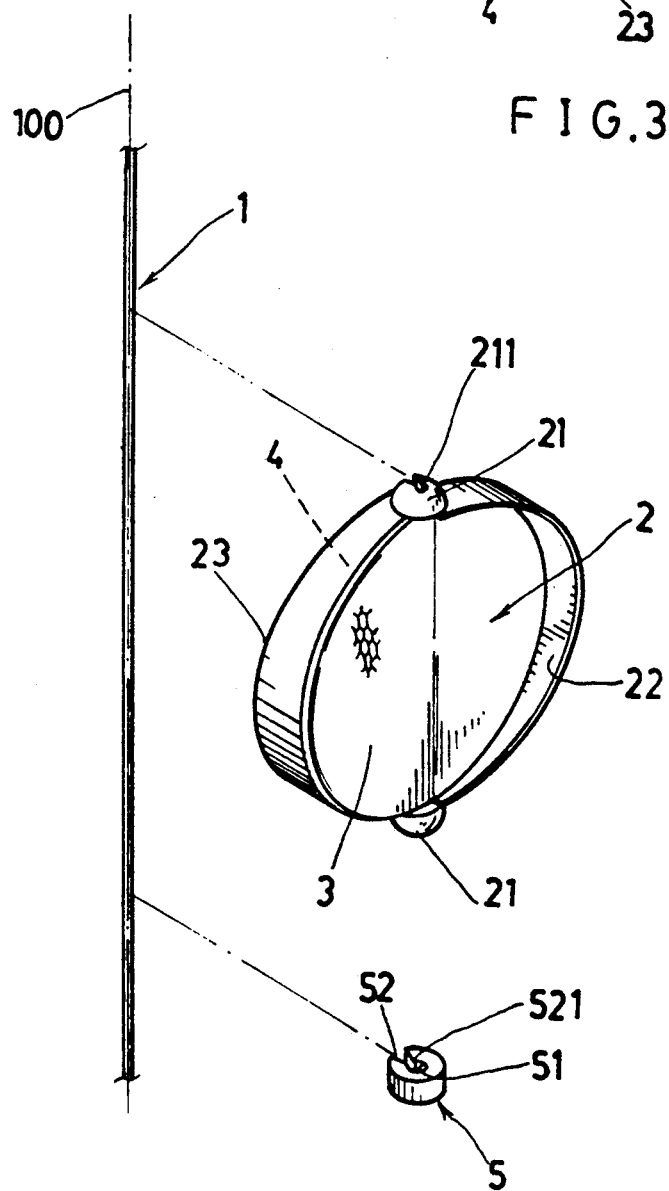
FIG. 2 is an exploded view of the present invention.
Figure 4:
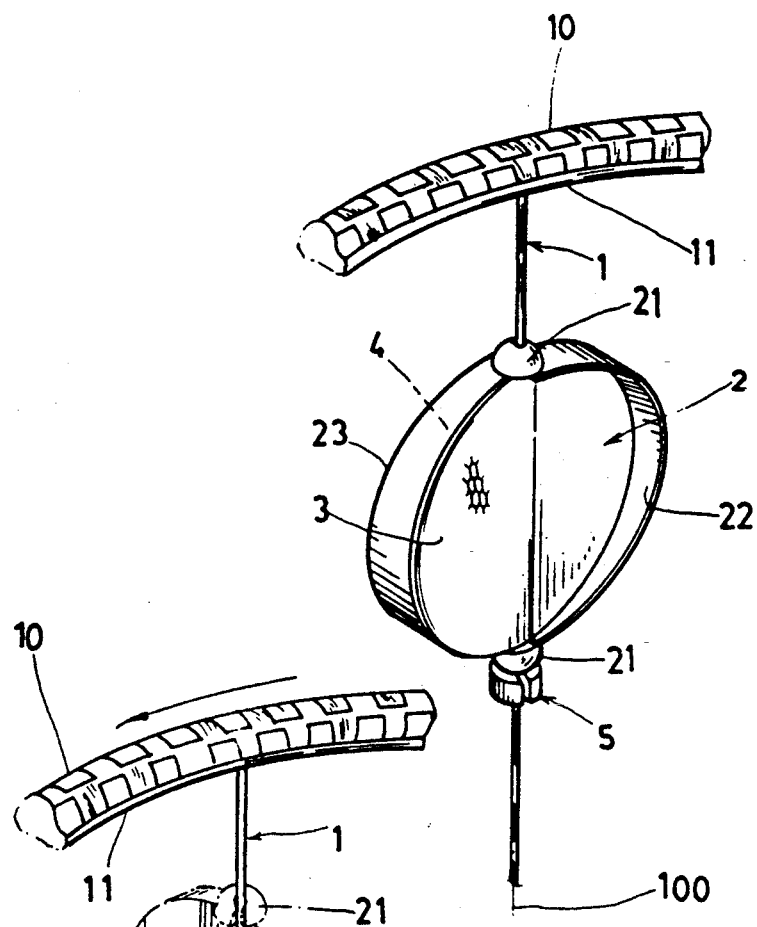
FIG. 4 is a perspective view showing an installation of the rotor disk of the present invention on the bike wheel.
Figure 5:
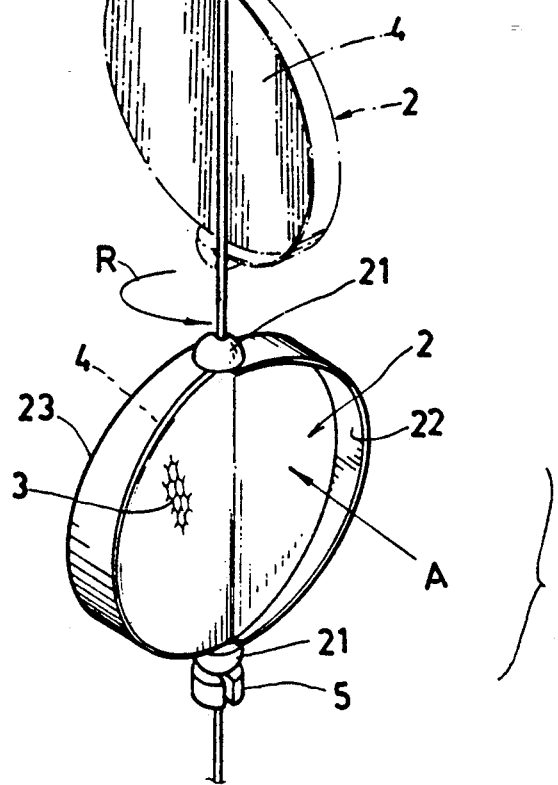
FIG. 5 shows a reciprocative or dynamic movement of the present invention when driving the bike.

The present invention as shown in FIGS. 1-6 is used in a bike wheel or any other wheels. However, the present invention can be used in any kinds of vehicle wheels and is not limited. A plurality of reflectors of the present invention may be fixed on each vehicle wheel.

The present invention comprises: a rotor disk 2 detachably rotatably mounted on a spoke 1 of a vehicle wheel 10 such as a bike wheel; a limiting retainer 5 detachably secured on the spoke 1 for limiting the rotor disk 2 on the spoke 1; the rotor disk 2 including a retroreflective surface 3 formed on a first surface of the rotor disk 2 capable of reflecting any incident light projecting onto the retroreflective surface 3 for forming a bright surface on the first surface of the rotor disk 2, a light-absorptive surface 4 formed on a second surface of the rotor disk 2 opposite to the first surface, capable of absorbing incoming lights projecting onto the light-absorptive surface 4 for forming a dark surface, a first blade 22 circumferentially formed on a first semi-peripheral edge portion of the rotor disk 2 and protruding outwardly in a first direction from the retroreflective surface 3 to be generally perpendicular to the retroreflective surface 3, and a second blade 23 circumferentially formed on a second semi-peripheral edge portion of the rotor disk 2 and protruding outwardly in a second direction from the light-absorptive surface 4 to be generally perpendicular to the light-absorptive surface 4 and opposite to the first blade 22 by an angle of 180 degrees; whereby upon a driving rotation of the vehicle wheel 10, the rotor disk 2 will face a wind or air force A and will be rotated about a longitudinal axis 100 existing in each spoke 1 to first orient the bright surface of the retroreflective surface 3 frontwardly for reflecting lights frontwardly and then subsequently orient the dark surface of the light-absorptive surface 4 frontwardly to cause a flashing operation of the rotor disk 2. Each blade 22 or 23 just occupies one half of the perimeter of the rotor disk 2 to cause an inbalance condition of the whole disk when subjected to a wind force, so that the blade 22 or 23 of the disk 2 will "catch" the wind to force the disk 2 to rotate about the axis 100.

The limiting retainer 5 is adjustably mounted on the spoke 1 to be restricted in between a wheel rim 11 of the vehicle wheel 10 and a hub 12 on an axle of the vehicle wheel 10.

The rotor disk 2 includes a pair of bushings 21 disposed on two opposite or diametrical ends of the rotor disk 2, each bushing 21 being detachably secured to each spoke 1.

The bushing 21 of the rotor disk 2 is formed with a shaft hole 211 for rotatably engaging a spoke 1 which serves as a shaft member for rotating the rotor disk 2 about the spoke 1, a bushing taper notch 212 radially tapered towards the shaft hole 211 from a peripheral edge portion of the bushing 21 to define a throat portion 212a having a width slightly smaller than a diameter of each spoke 1 so that each rotor disk 2 can be snapped and secured on the spoke 1 by smoothly inwardly feeding the spoke 1 along the bushing taper notch 212 until engaging the shaft hole 211 of each bushing 21 with the spoke 1 for stably holding the bushing 21 and the rotor disk 2 on the spoke, without requiring any tool or instrument, for conveniently quickly mounting each rotor disk 2 on each spoke.

The limiting retainer 5 is generally disk shaped or circular-disk shaped, and is formed with a central hole 51 snugly engageable with the spoke 1, and a retainer taper notch 52 tapered radially inwardly from a peripheral edge portion of the retainer 5 towards the central hole 51 defining a retainer throat portion 521 having a width smaller than a diameter of the spoke 1 for a sturdy fixation of the retainer 5 on the spoke 1.

The retainer 5 and rotor disk 2 may be made with plastic or other materials. The dark light-absorptive surface 4 on the rotor disk 2 may be formed with any dark or black color or mixed colors of darkness, not limited in this invention.

In using the present invention, the bike wheel 10 is rotated in a forward direction F to allow each rotor disk 2 to face an incoming wind or air force A to thereby rotate the rotor disk 2 about each longitudinal axis 100 of the spoke 1 to cause a flashing operation for traffic warning purpose.

Figure 6:
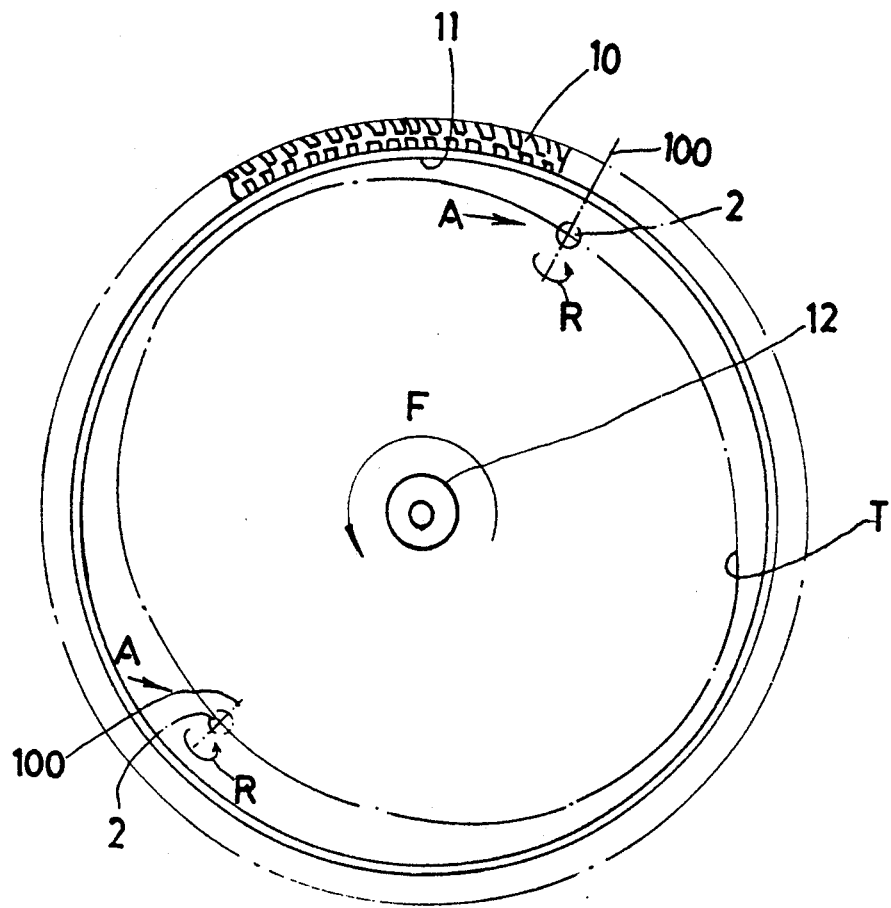
FIG. 6 is an illustration showing a running bike wheel when fixed with the present invention.
Figure 7:
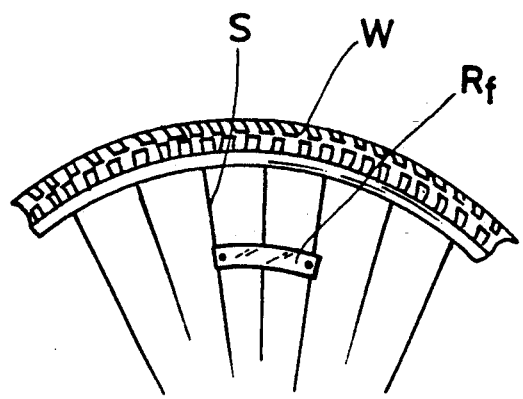
FIG. 7 shows a conventional bike reflector.
Figure 8:
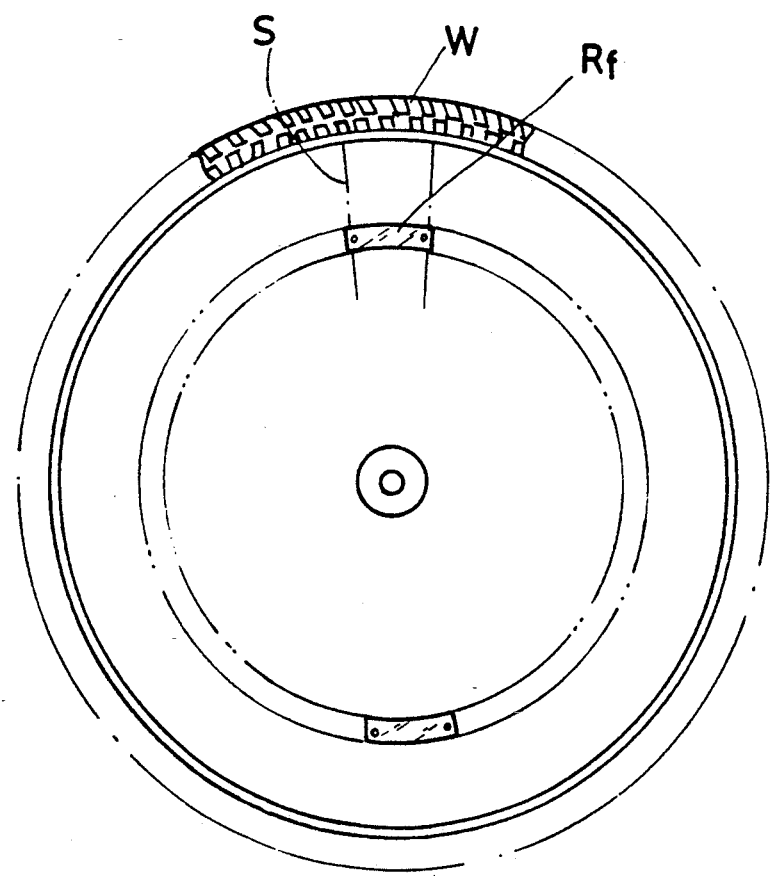
FIG. 8 is an illustration when running a bike wheel provided with the reflector as shown in FIG. 7.

During the bike running, the wheel 10 may be driven quicker or even slower depending upon the driver or rider's treadling operation, road condition, slopes of the road, wind force and other factors. A quicker rotation of the wheel may thrust the rotor disk 2 radially outwardly towards the rim 11 due to larger centrifugal force by the rotating wheel 10 and a slower rotation of the wheel 10 may move the disk 2 downwardly due to lower centrifugal and gravitational force of the disk 2, the interacting centrifugal force and gravitational force will therefore diversify many tracking shapes, circle, oval, or irregular "illuminative" rings T of the reflectors of this invention as shown in FIG. 6 especially in night time and subjected to incident light exposure for enhancing traffic warning, decorative effect, and bike owner's interest.

The retainer 5 may be optionally adjusted on the spoke 1 for defining the movement of each rotor disk 2 for varying its circular or oval or other moving tracks. A retainer 5 positioned on the spoke 1 near the axle or hub 12 of the wheel 10 will have a more dynamic movement of the rotor disk 2 on the spoke 1 than a retainer 5 positioned on the spoke 1 approximate to the rim 11 of the wheel 10, which can be variably adjusted according to the user's options.

The present invention may also be used on any other parts of a vehicle or movable device for flashing effect under wind pressure.

The number, positioning, arrangements or installation of the retainers as well as the rotor disks 2 of this invention are not limited, which can be optionally designed or modified by a vehicle owner or user for diversified choices.

I claim:

1. A flashing reflector comprising:
   a rotor disk detachably rotatably mounted on a spoke of a vehicle wheel;
   at least a limiting retainer detachably secured on said spoke for limiting said rotor disk on said spoke;
   the rotor disk including a retroreflective surface formed on a first surface of the rotor disk capable of reflecting any incident light projecting onto the retroreflective surface for forming a bright surface on the first surface of the rotor disk, a light-absorptive surface formed on a second surface of the rotor disk opposite to the first surface, capable of absorbing incoming lights projecting onto the light-absorptive surface for forming a dark surface, a first blade circumferentially formed on a first semi-peripheral edge portion of the rotor disk and protruding outwardly in a first direction from the retroreflective surface to be generally perpendicular to the retroreflective surface, and a second blade circumferentially formed on a second semi-peripheral edge portion of the rotor disk and protruding outwardly in a second direction from the light-absorptive surface to be generally perpendicular to the light-absorptive surface and opposite to the first blade by an angle of 180 degrees; whereby upon a driving rotation of the vehicle wheel, the rotor disk will face a wind force and will be rotated about a longitudinal axis existing in said spoke to orient the bright surface of the retroreflective surface and then subsequently orient the dark surface of the light-absorptive surface towards an observer's eyes to cause a flashing operation of the rotor disk by continuously repeating a rotation cycle of the bright and dark surfaces on two opposite surfaces of said disk.

2. A flashing reflector according to claim 1, wherein said limiting retainer is adjustably mounted on the spoke to be restricted in between a wheel rim of the vehicle wheel and a hub on an axle of the vehicle wheel.

3. A flashing reflector according to claim 1, wherein said rotor disk includes a pair of bushings disposed on two opposite ends of the rotor disk, each said bushing being detachably secured to said spoke.

4. A flashing reflector according to claim 3, wherein each said bushing of the rotor disk is formed with a shaft hole for rotatably engaging a spoke which serves as a shaft member for rotating the rotor disk about the spoke, a bushing taper notch radially tapered towards the shaft hole from a peripheral edge portion of the bushing to define a throat portion having a width slightly smaller than a diameter of said spoke so that said rotor disk can be snapped and secured on the spoke by smoothly inwardly feeding the spoke along the bushing taper notch until rotatably engaging the shaft hole of each said bushing with the spoke.

5. A flashing reflector according to claim 1, wherein said limiting retainer is generally disk shaped, and is formed with a central hole snugly engageable with the spoke, and a retainer taper notch tapered radially inwardly from a peripheral edge portion of the retainer towards the central hole defining a retainer throat portion having a width smaller than a diameter of the spoke for a sturdy fixation of the retainer on the spoke.

* * * * *